Figure 1:
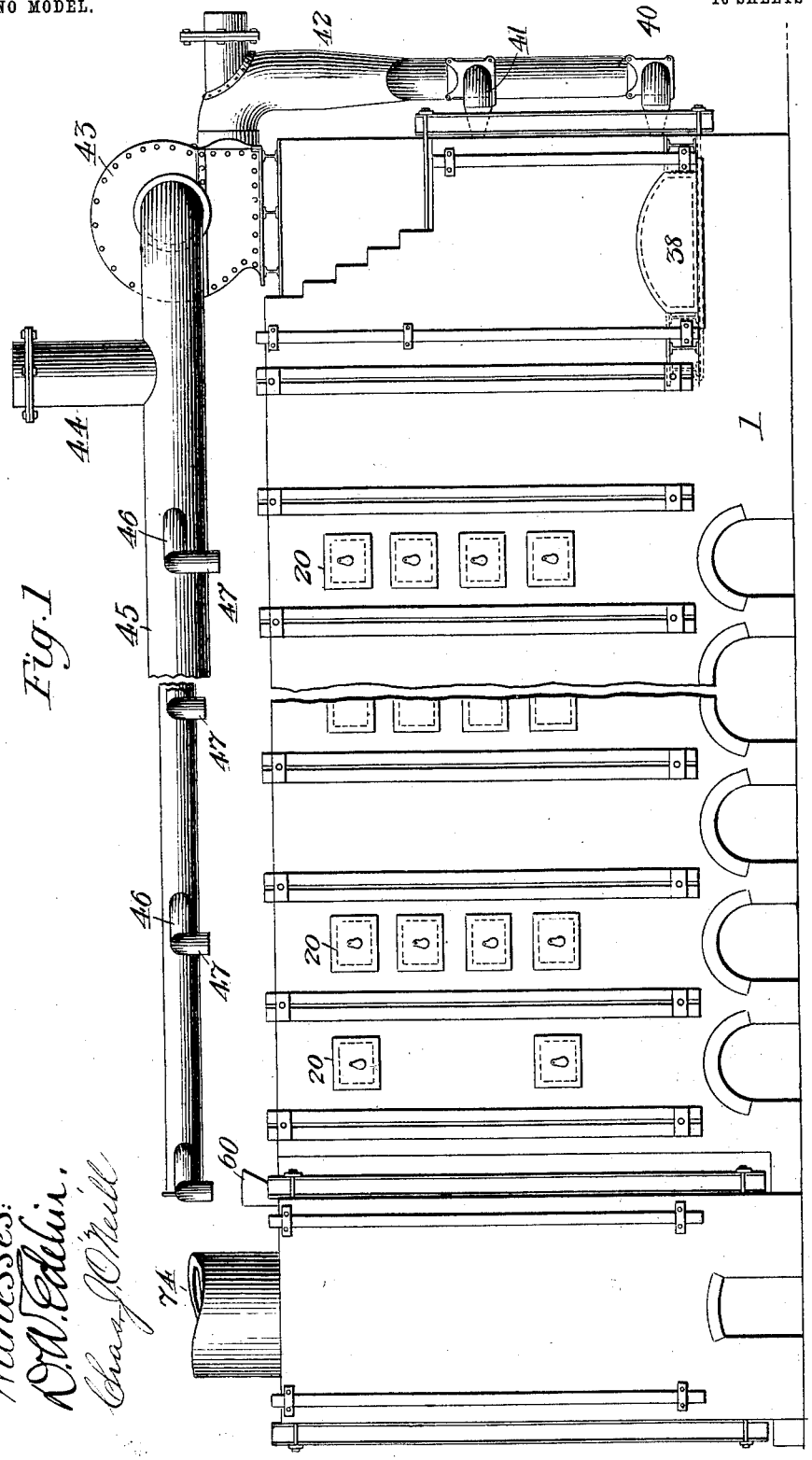

No. 756,485. PATENTED APR. 5, 1904.
F. J. FALDING.
ROASTING OR DESULFURIZING FURNACE.
APPLICATION FILED JUNE 14, 1901.
NO MODEL. 16 SHEETS—SHEET 5.

Witnesses:
D. W. Edelin.
Chas. J. O'Neill.

Inventor:
Frederic J. Falding,
by Bennie & Goldsborough,
Attys.

No. 756,485. PATENTED APR. 5, 1904.
F. J. FALDING.
ROASTING OR DESULFURIZING FURNACE.
APPLICATION FILED JUNE 14, 1901.
NO MODEL. 19 SHEETS—SHEET 9.

Witnesses:
D. W. Edelin.
Chas. J. O'Neill

Inventor:
Frederic J. Falding,
by Rennie & Goldsborough,
Attys

No. 756,485. PATENTED APR. 5, 1904.
F. J. FALDING.
ROASTING OR DESULFURIZING FURNACE.
APPLICATION FILED JUNE 14, 1901.
NO MODEL. 16 SHEETS—SHEET 10.

Witnesses:
D. W. Edelin.
Chas. J. O'Neill

Inventor:
Frederic J. Falding,
by Pennie & Goldsborough,
Attys

No. 756,485. PATENTED APR. 5, 1904.
F. J. FALDING.
ROASTING OR DESULFURIZING FURNACE.
APPLICATION FILED JUNE 14, 1901.
NO MODEL. 16 SHEETS—SHEET 11.
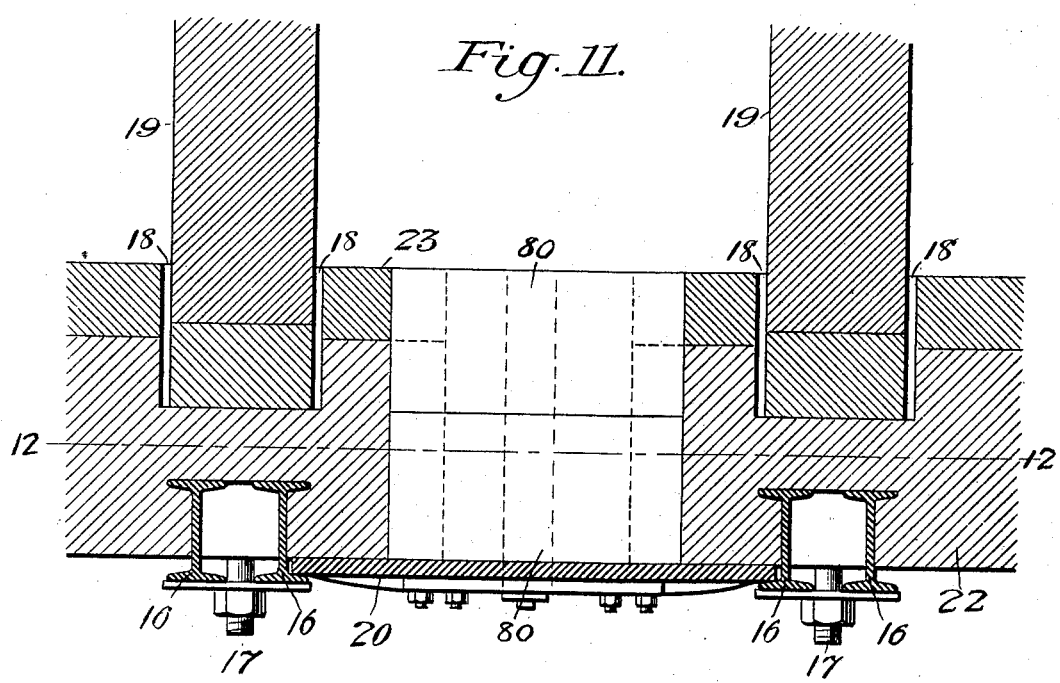
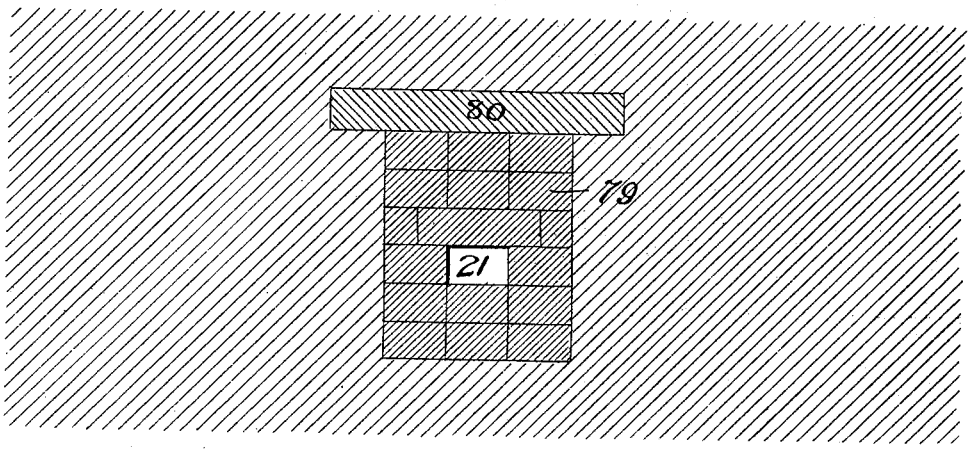
Witnesses:
D. W. Edelin,
Chas. J. O'Neill
Inventor:
Frederic J. Falding,
by Pennie & Goldsborough,
Attys.

No. 756,485. PATENTED APR. 5, 1904.
F. J. FALDING.
ROASTING OR DESULFURIZING FURNACE.
APPLICATION FILED JUNE 14, 1901.
NO MODEL. 16 SHEETS—SHEET 12.
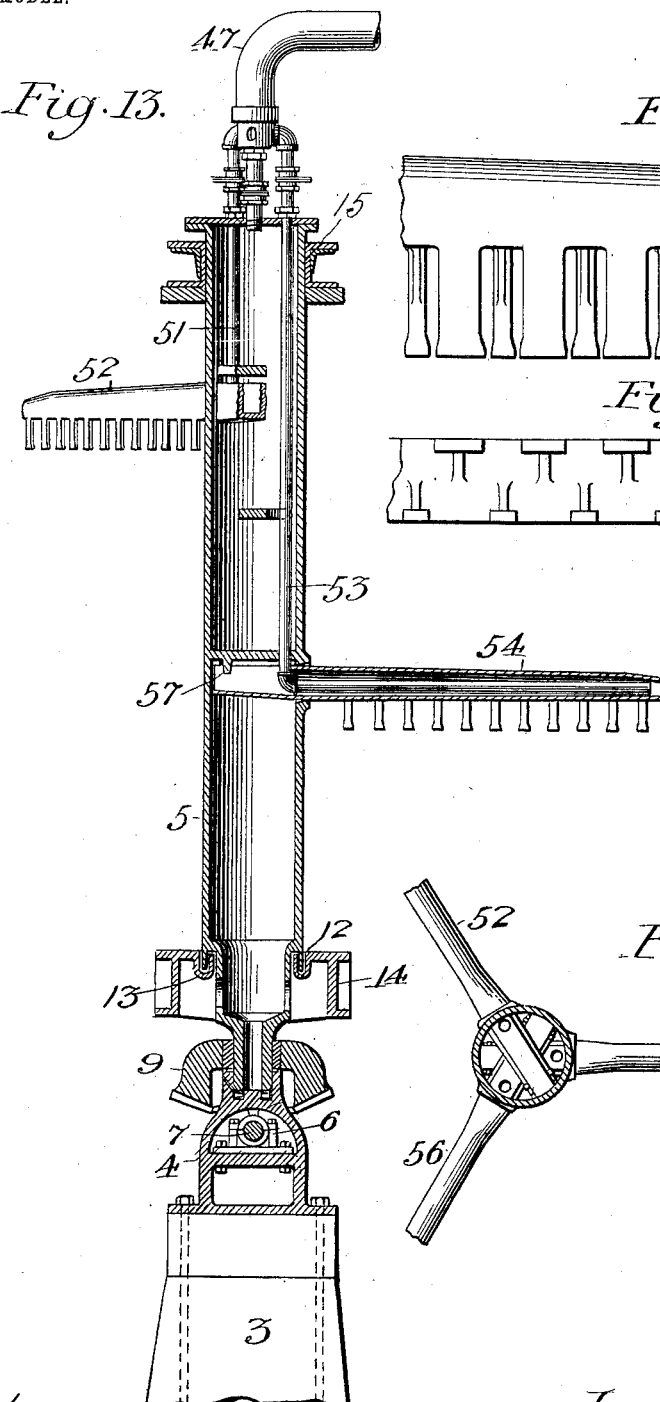

No. 756,485. PATENTED APR. 5, 1904.
F. J. FALDING.
ROASTING OR DESULFURIZING FURNACE.
APPLICATION FILED JUNE 14, 1901.
NO MODEL. 16 SHEETS—SHEET 13.

Witnesses:
Inventor:
Frederic J. Falding,
by Bennie & Goldsborough,
Attys

No. 756,485. PATENTED APR. 5, 1904.
F. J. FALDING.
ROASTING OR DESULFURIZING FURNACE.
APPLICATION FILED JUNE 14, 1901.
NO MODEL. 16 SHEETS—SHEET 14.
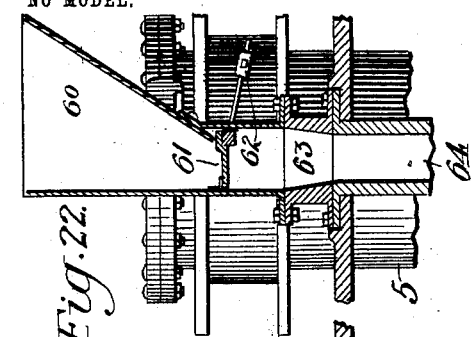
Fig. 22.
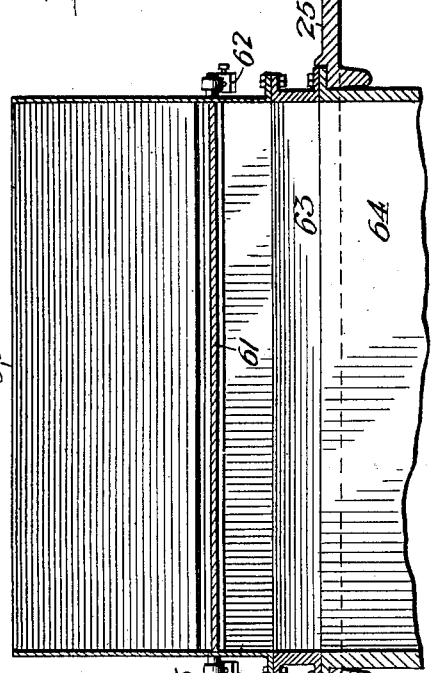
Fig. 20.
Fig. 21.
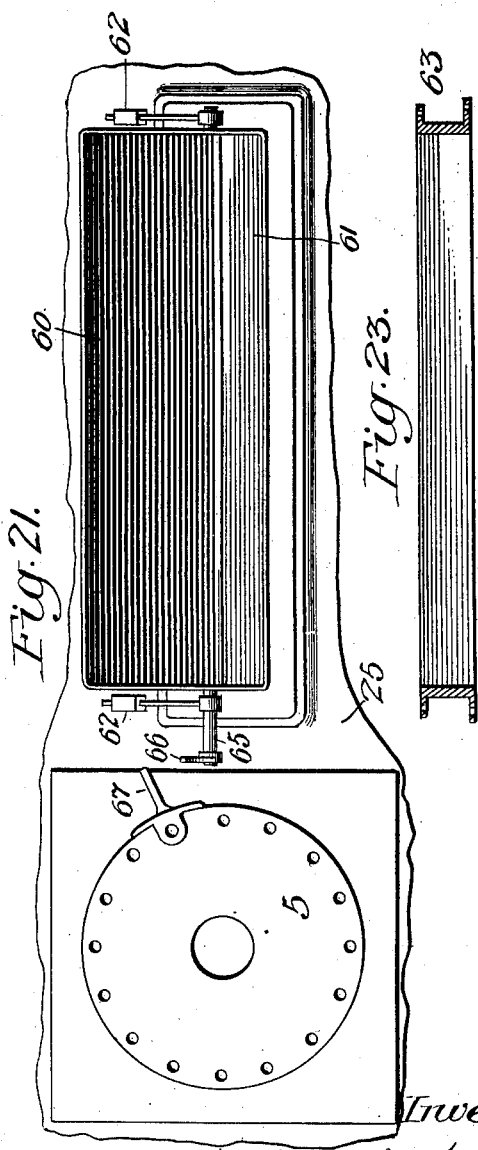
Fig. 23.
Witnesses
D. W. Edelin.
Chas. J. O'Neill.
Inventor
Frederic J. Falding,
by Jennie R. Goldsborough,
Attys.
THE NORRIS PETERS CO., PHOTO-LITHO., WASHINGTON, D. C.

No. 756,485. PATENTED APR. 5, 1904.
F. J. FALDING.
ROASTING OR DESULFURIZING FURNACE.
APPLICATION FILED JUNE 14, 1901.
NO MODEL. 16 SHEETS—SHEET 15.

Witnesses:
D. W. Edelin
Chas. J. O'Neill

Inventor:
Frederic J. Falding,
by Pennie & Goldsborough,
Attys.

No. 756,485. PATENTED APR. 5, 1904.
F. J. FALDING.
ROASTING OR DESULFURIZING FURNACE.
APPLICATION FILED JUNE 14, 1901.
NO MODEL. 16 SHEETS—SHEET 16.

Witnesses:
D. W. Edelin.
Chas. J. O'Neill

Inventor:
Frederic J. Falding,
by Lemmie & Goldsborough,
Attys.

No. 756,485. Patented April 5, 1904.

UNITED STATES PATENT OFFICE.

FREDERIC JOHN FALDING, OF NEW YORK, N. Y.

ROASTING OR DESULFURIZING FURNACE.

SPECIFICATION forming part of Letters Patent No. 756,485, dated April 5, 1904.

Application filed June 14, 1901. Serial No. 64,556. (No model.)

*To all whom it may concern:*

Be it known that I, FREDERIC JOHN FALDING, a citizen of the United States, residing at New York, county of New York, and State of New York, have invented certain new and useful Improvements in Roasting or Desulfurizing Furnaces; and I do hereby declare the following to be a full, clear, and exact description of the invention, such as will enable others skilled in the art to which it appertains to make and use the same.

My invention relates to certain new and useful improvements in roasting or desulfurizing kilns or furnaces, wherein the ore to be roasted or desulfurized is caused to travel by the action of mechanical stirrers from the inlet or feed opening to the outlet or discharge opening in such manner as to be distributed over the bed or hearth of the furnace in a layer of gradually-decreasing thickness. The relation of the mechanical stirrers to each other and to the furnace-hearth is such that this graduated distribution of the charge is obtained without inclining the hearth itself and is feasible when the hearth is arranged in several stages or sections one above the other.

My invention also contemplates the cooling of the arms of the revolving stirrers in such manner that the cooling effect upon each particular arm may be graduated to the particular temperature to which it is subjected. The cooling agent employed for this purpose is air, which after traversing the stirrer arm or arms is directed by a pneumatic fan either into the open air or into the heating-furnace, or into the desulfurizing-chamber itself, according to the particular circumstances of the case.

My invention further consists in an improved construction of the furnace-chamber, whereby expansion and contraction are provided for and whereby individual portions of the brickwork of the furnace-walls may be removed with safety and facility for the purpose of repairing, rebuilding, or the like without endangering the integrity of the remainder. The construction is likewise so designed that the floor plates or tiles span the entire space between the adjacent arches of the kiln-floors and form a smooth continuous floor with the transverse vertical ridges of the arches.

Figure 2:
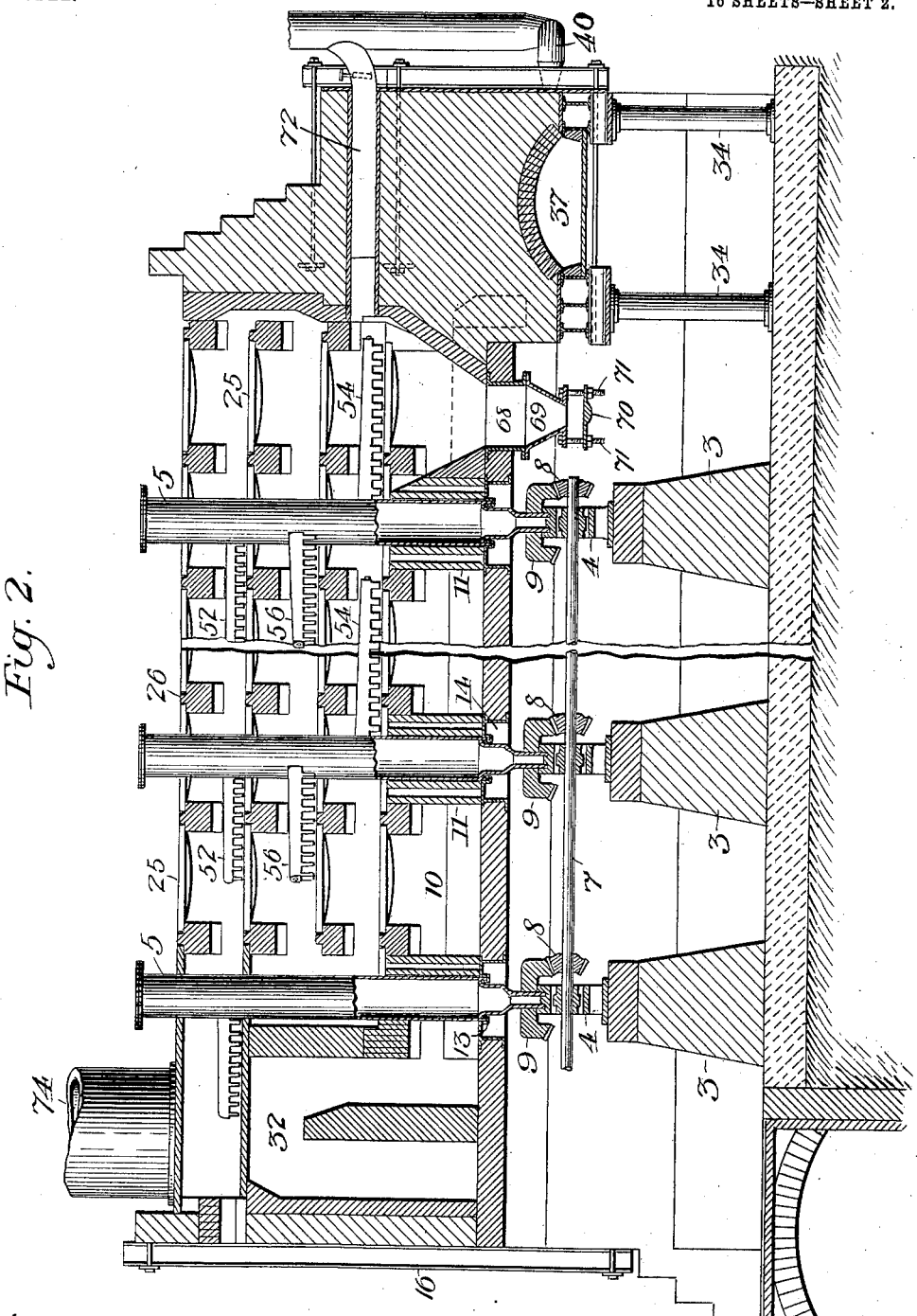
Figure 3:
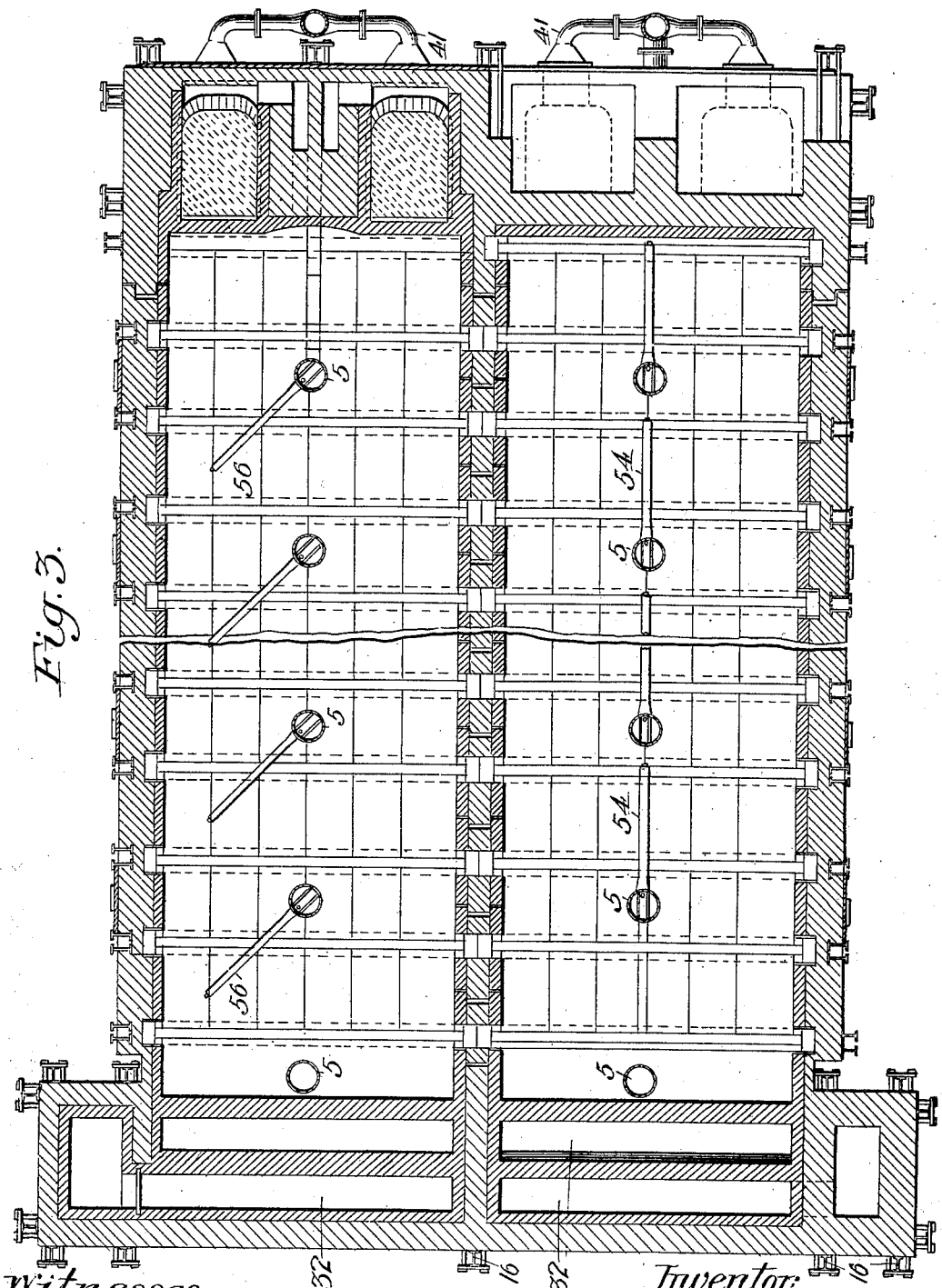
Figure 4:
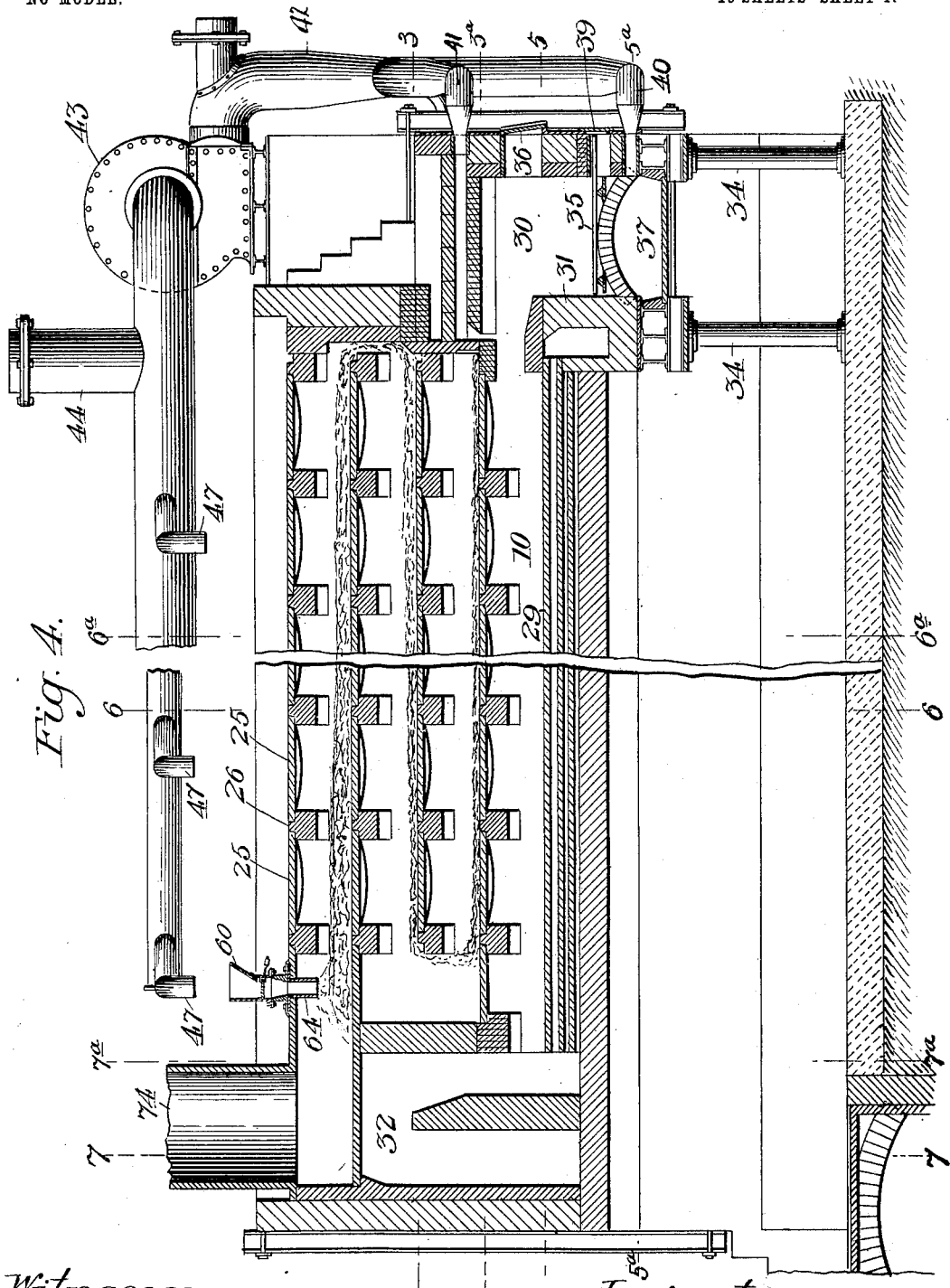
Figure 5:
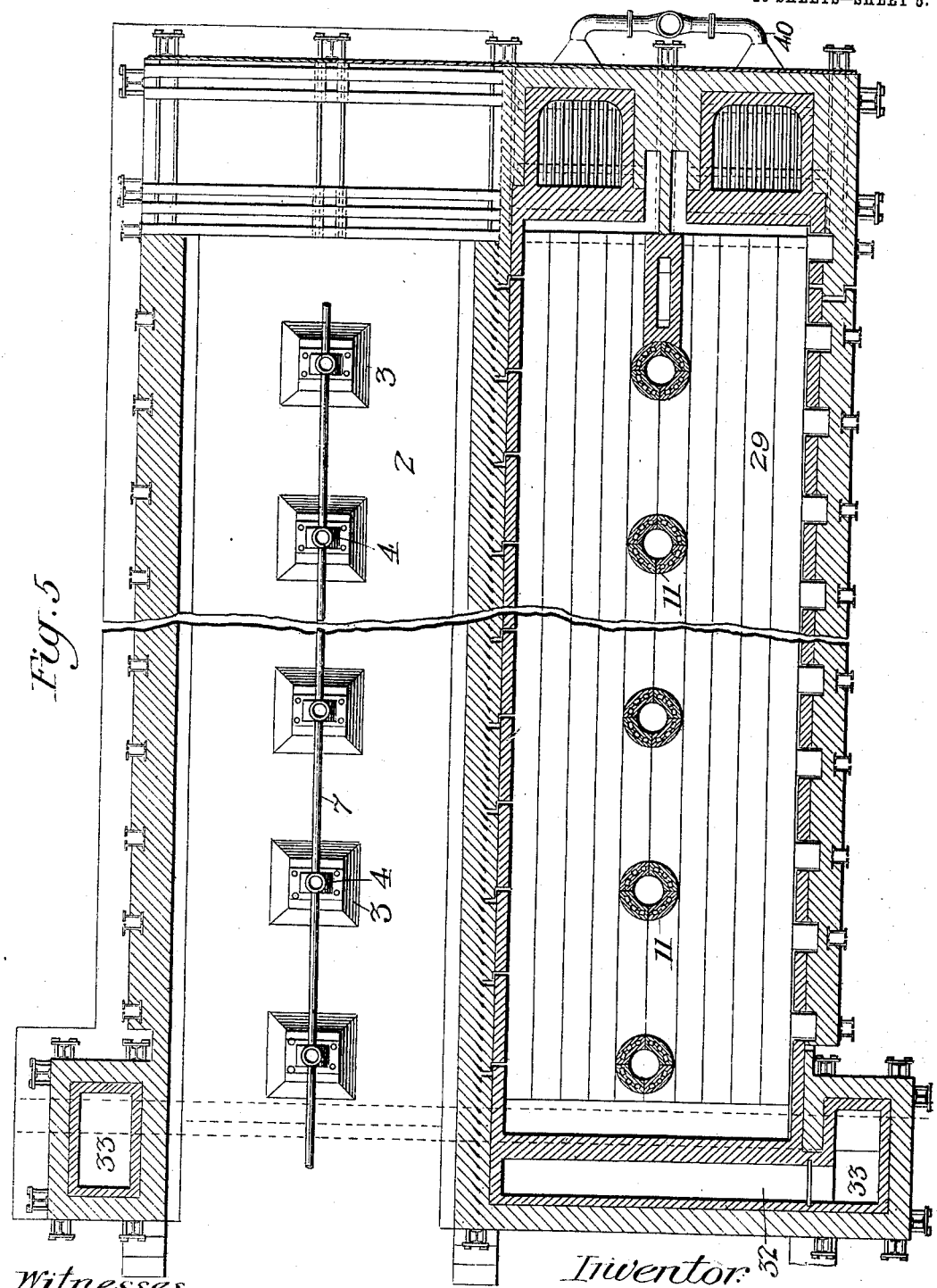
Figure 6:
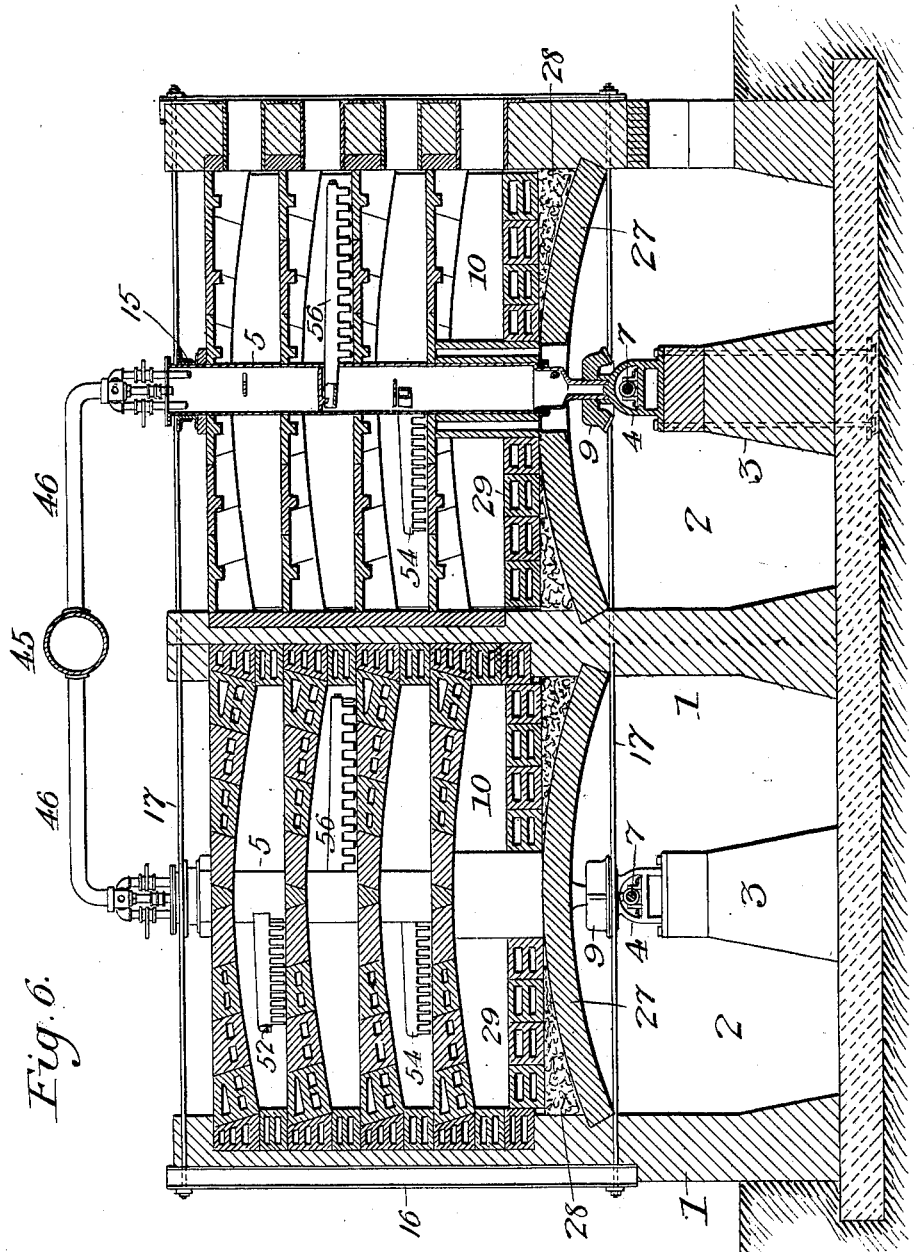
Figure 7:
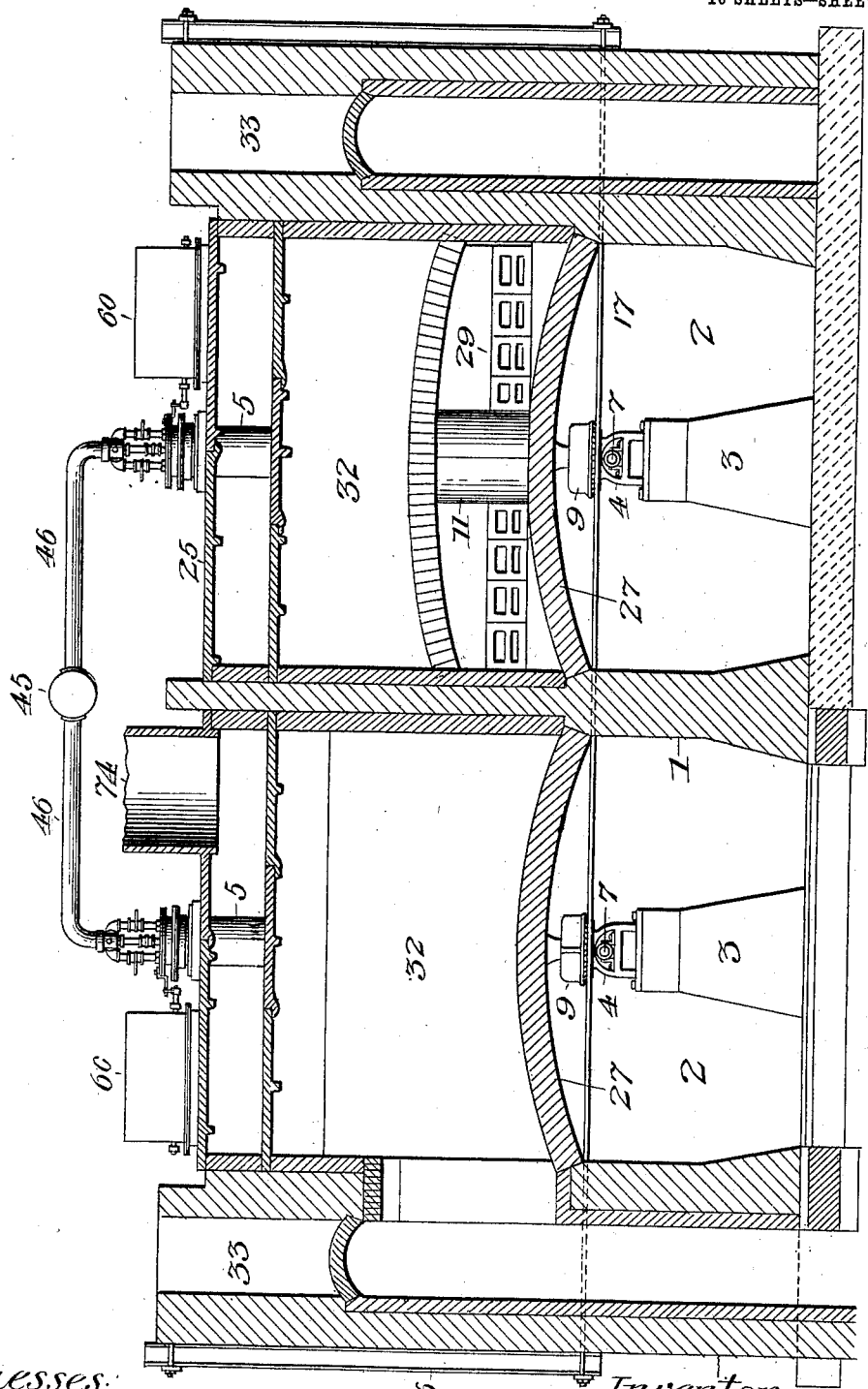
Figure 8:
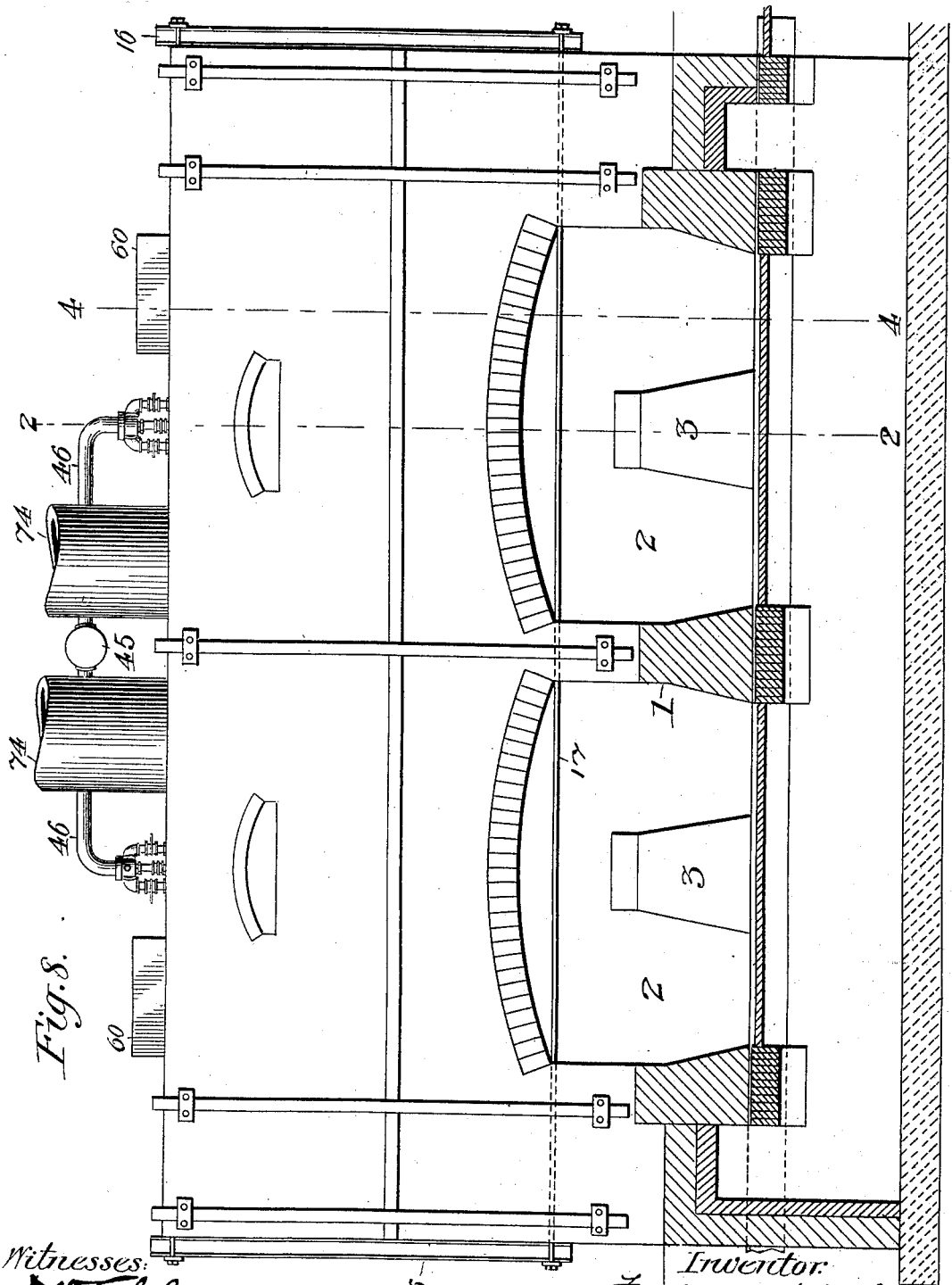
Figure 9:
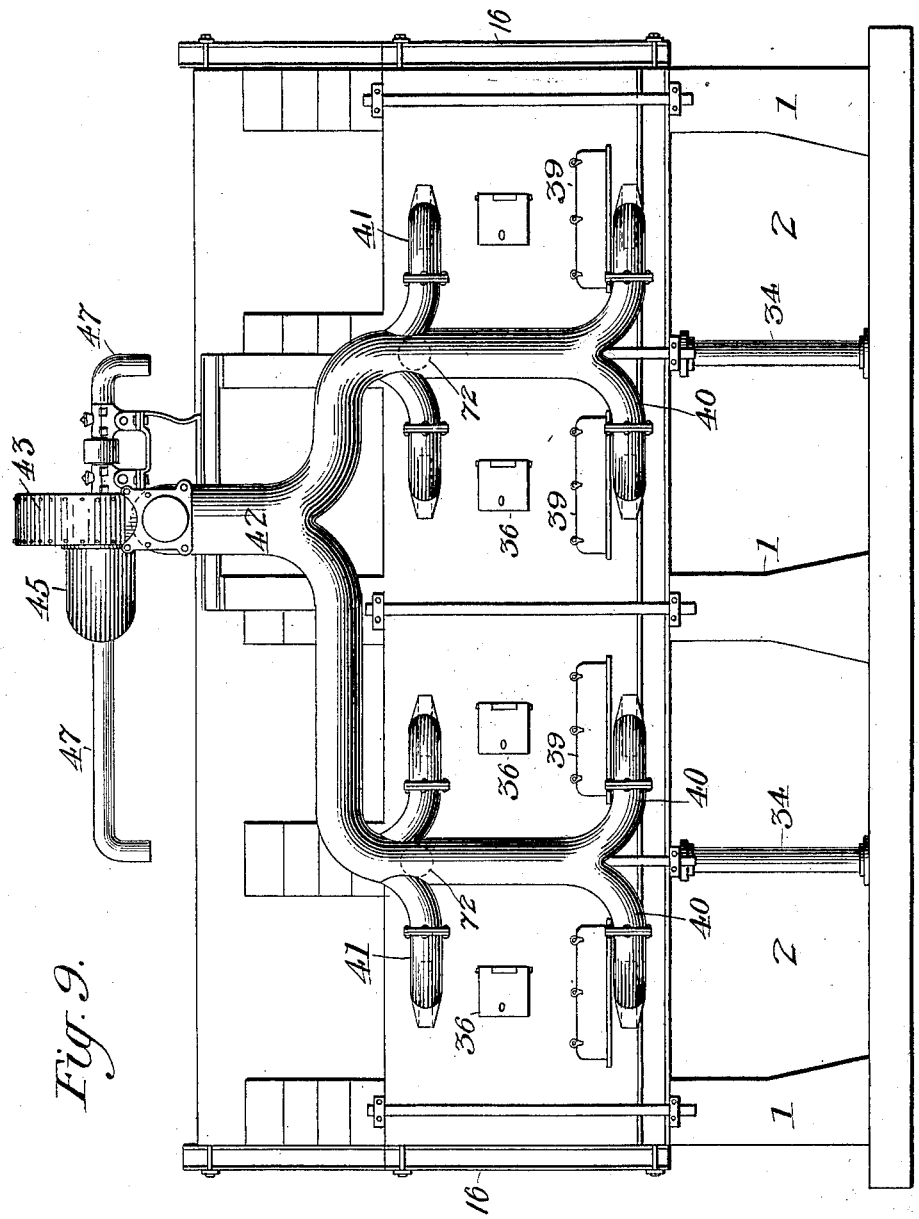
Figure 10:
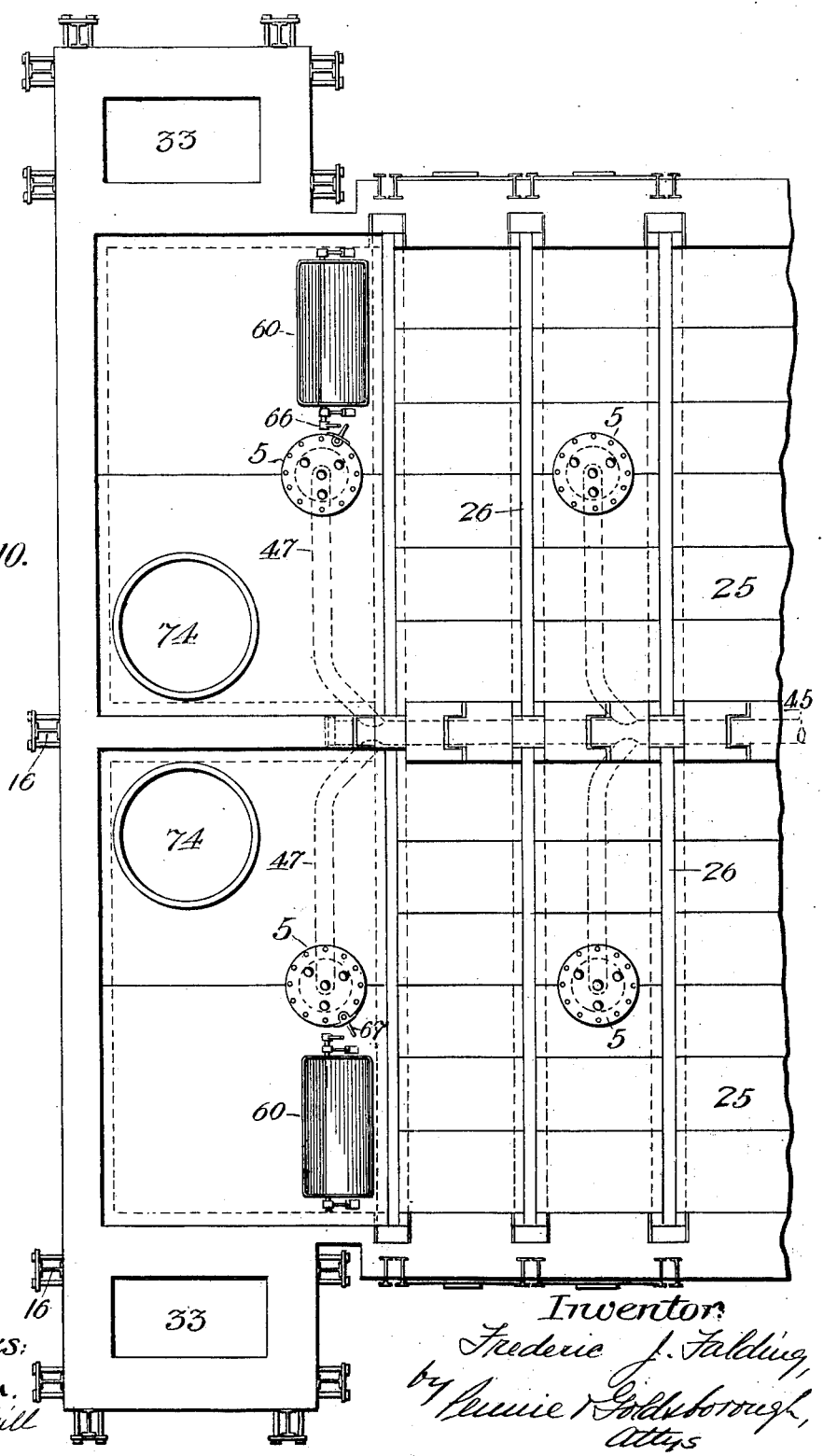
Figure 19:
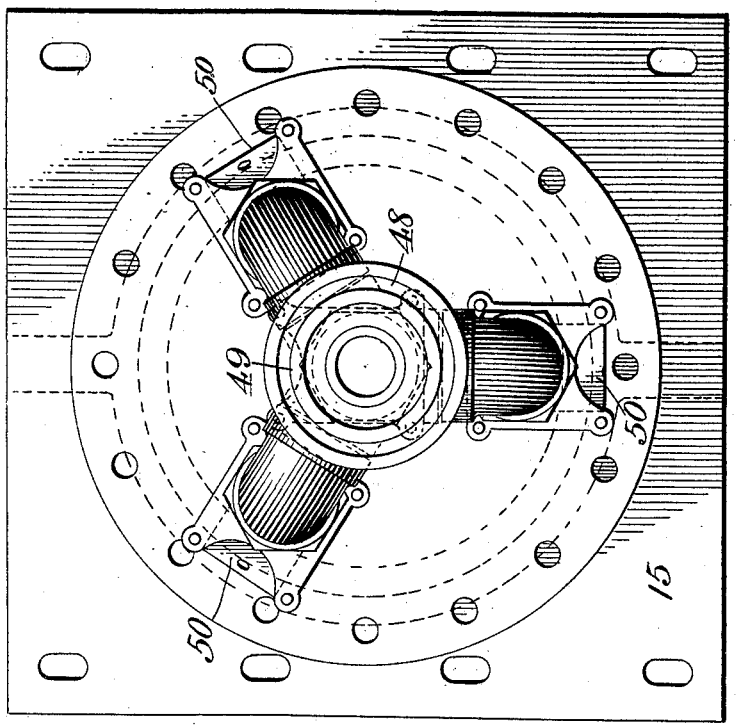
Figure 18:
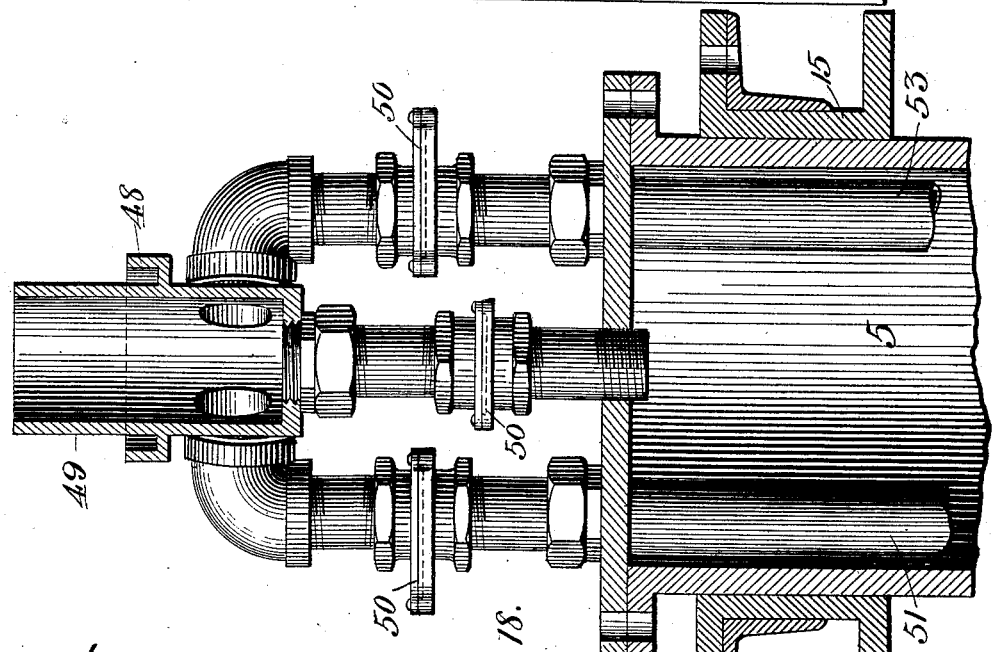
Figure 24:
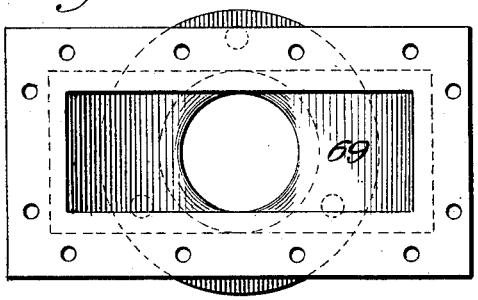
Figure 25:
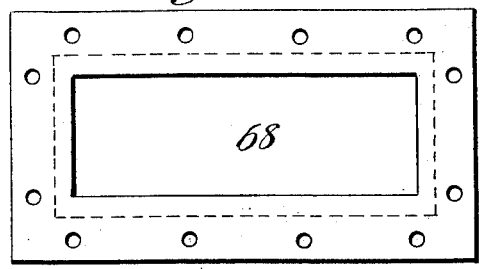
Figure 26:
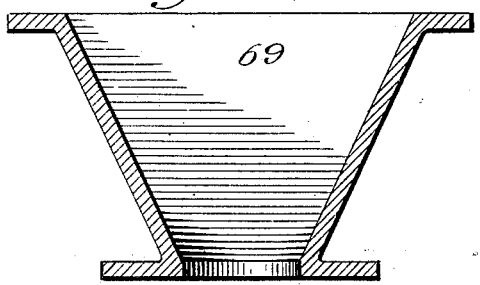
Figure 27:
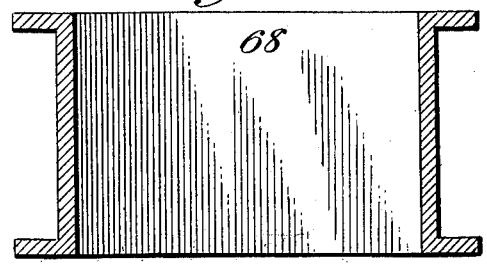
Figure 28:
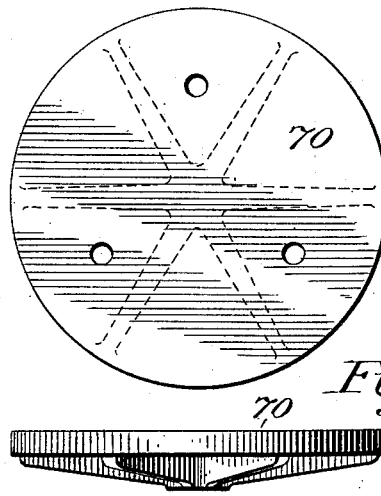
Figure 29:
Figure 30:
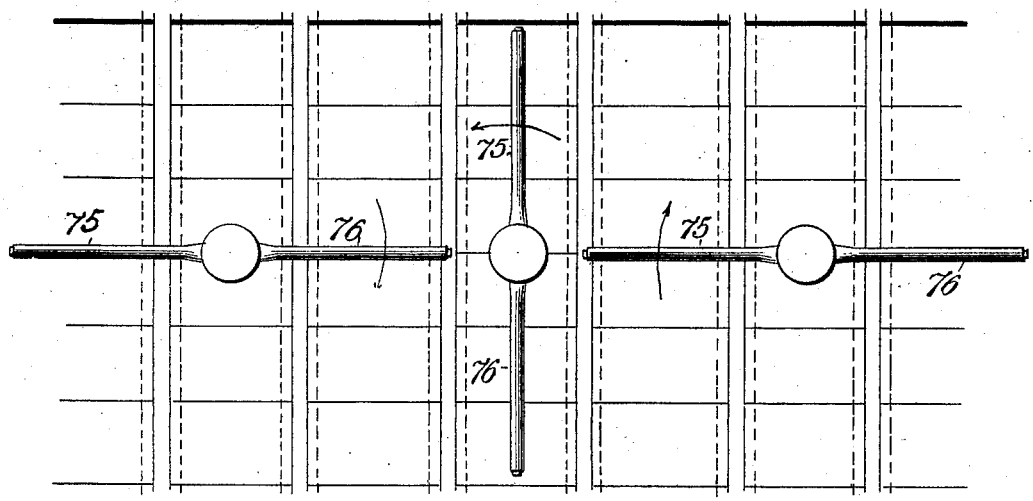
Figure 31:
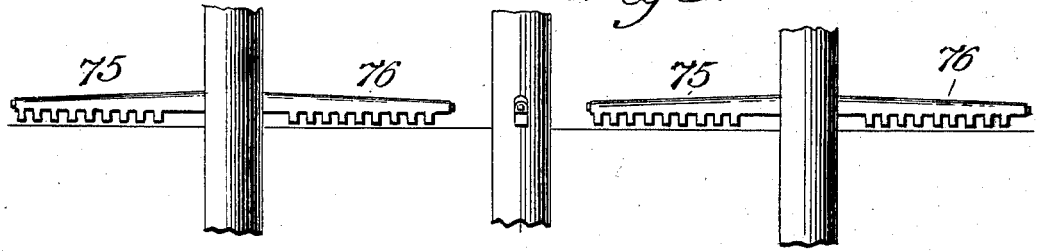
Figure 32:
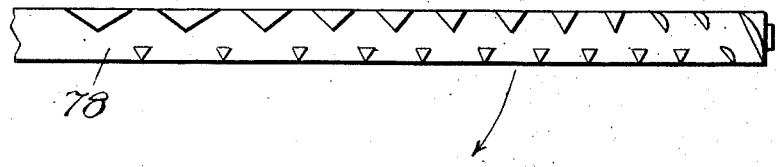

In the accompanying drawings, Figure 1 represents a side elevation of the kiln embodying my invention, partly broken away in order to show the construction on a correspondingly large scale. Fig. 2 represents a section on the line 2 2 of Fig. 8, but omitting certain parts of the air cooling system. Fig. 3 represents a horizontal section on the line 3 3 and $3^a$ $3^a$ of Fig. 4. Fig. 4 represents a sectional elevation on the line 4 4 of Fig. 8, but with the stirrers removed. Fig. 5 represents a horizontal section on the line 5 5 and $5^a$ $5^a$ of Fig. 4. Fig. 6 represents a section on the lines 6 6 and $6^a$ $6^a$ of Fig. 4. Fig. 7 represents a transverse section on the lines 7 7 and $7^a$ $7^a$ of Fig. 4. Fig. 8 represents a rear elevation, partly in section. Fig. 9 represents a front elevation. Fig. 10 represents, on a somewhat larger scale, a plan view of the rear portion of the furnace. Fig. 11 represents in section and in a larger scale the portion of the furnace-walls between adjacent arches. Fig. 12 represents a vertical section on the line 12 12 of Fig. 11. Fig. 13 represents, partly in section and partly in elevation, one of the revolving stirrers and its adjuncts. Figs. 14, 15, and 16 represent, on a larger scale, the construction of one of the stirrer-arms. Fig. 17 represents in plan the relative arrangement of the stirrer-arms and the rotating stirrer-column. Fig. 18 represents, on a larger scale, partly in section and partly in elevation, the upper portion of the rotating stirrer-column and its connections. Fig. 19 represents, also on a larger scale, a top plan view of the parts shown in Fig. 18. Fig. 20 represents a longitudinal section through the feed-hopper and the adjacent revolving stirrer-column and illustrates the manner of automatically tripping the feed-hopper gate. Fig. 21 represents a top plan view of the parts shown in Fig. 20. Fig. 22 represents a vertical section through the feed-hopper. Fig. 23 represents a vertical section through a part of the throat or passage-way leading from the feed-hopper to the interior of the kiln. Figs. 24 to 27, inclusive, represent, partly in plan and partly in section, detail views of the discharge-hopper. Figs. 28 and 29 represent, respectively, a top plan view and side elevation of the sealing-plate of the discharge-hopper. Figs. 30 and 31 represent, respectively, in plan and elevation, a modified arrangement of the stirrer-arms. Fig. 32 represents a bottom plan view of a modified construction of stirrer-arm.

Similar characters of reference indicate similar parts throughout the several views.

In order to obtain an appropriate capacity of output for the plant, I prefer to construct the furnace in two homologous parts, as indicated in the sectional views, each of these parts being identical in construction with its neighbor. It will be obvious, however, that the invention in all of its main distinguishing characteristics is present in each half of the construction illustrated and that it is entirely feasible and within the province of my invention to embody all the features which have been mentioned in the construction of a single kiln instead of in the construction of the double kiln illustrated.

The main body portion of the furnace, as illustrated, rests upon suitable foundation-walls 1, leaving intermediate galleries 2, within which are located at suitable intervals piers 3 for supporting step-bearings 4 for the stirrer-columns 5 and for supporting the bearings 6 of the line-shafting 7, whereby the weight of the revolving stirrer-columns, with their adjuncts, is borne entirely by the piers 3 instead of by the furnace-walls. The line-shafting 7 is provided with a series of gears 8, intermeshing with a similar series of gears 9 upon the foot of the columns 5. The columns at their lower portions, where they pass through the heating-chamber 10 of the furnace, are surrounded with four hollow tiles 11, as indicated in Fig. 5, for the purpose of protecting the columns from warping in consequence of the passing products of combustion and the heat and corrosion incident thereto. As indicated in Fig. 13, the columns are likewise provided with depending flanges 12, which project into corresponding sealing-grooves 13 of the castings 14, the grooves being suitably luted with sand or other material, so as to prevent the escape of the furnace-gases into the gallery. At their upper ends the revolving stirrer-columns, as indicated in Figs. 13, 6, pass through cylindrical bearings 15, which also serve as stuffing-boxes to prevent egress of the sulfurous vapors thereat.

The walls of the furnace are strengthened exteriorly by vertical buckstaves 16, with connecting tie-rods, as shown. Opposite each pair of vertical buckstaves is constructed an independent series of arches, as indicated more fully in Figs. 2, 3, 4, and 6, these arches being preferably made for the most part of hollow tiles, (see Fig. 6,) having their side piers resting upon the foundation-walls. The relative arrangement of the buckstaves to the arches is further shown in Fig. 11, wherein are likewise indicated the expansion-spaces 18 on either side of the arches 19 and also the protecting-plate 20 for the sight-hole 21, (shown in section in Fig. 12,) said sight-hole being made up by means of bricks or tiles 79, protected by the capping-tiles 80. The space between the series of arches is filled in with brickwork 22, lined on the interior with refractory tiles 23, and the several kiln-floors are completed by laying a series of floor-tiles 25 (see Fig. 4) upon the arches, these floor-tiles being of a length sufficient to span the space between adjacent arches and to abut against the vertical transverse ridges 26 of the arches, thereby constituting a smooth level floor. Upon the vaults or arches 27 of the galleries in which the piers 3 are located is laid a body of concrete 28, surmounted by a flooring of hollow tiles 29, constituting the floor of the heating-chamber 10.

It will be apparent that any part of the main body portion of the furnace as thus constructed is capable of being repaired with great facility without endangering the safety of parts adjacent to those where the repairs are under way. The main body portion of the furnace, in fact, consists of a series of practically independent parts—to wit, the individual series of arches, each of which is self-sustaining, because it rests firmly upon its own foundation and because it is furthermore strengthened and sustained by its individual buckstaves and tie-rods. It is entirely feasible, therefore, in a furnace so constructed to tear down and rebuild any particular part of the furnace-walls that may need repairing without danger to the rest of the structure.

At the forward end of the furnace is located the combustion-chamber 30, having hollow bridge-walls 31, supplying air to the hollow floor-tiles 29, whereby the products of combustion as they enter the uptake and downtake chamber 32 on their way to the stacks 33 are supplied with heated air, so as to complete their combustion as far as possible in said chamber. The combustion-chamber may conveniently rest upon columns 34. In the form illustrated in the drawings it is adapted for the combustion of solid fuel and for that purpose is provided with the customary grate-bars 35, fuel-supply doors 36, ash-pit 37, ash-pit doors 38, and stoking-doors 39. It is illustrated as supplied with primary blasts 40 and secondary blasts 41, the former connecting with the combustion-chamber beneath the grate-bars and the latter meeting the products of combustion as they pass over the bridge-wall. Either or both of these blasts may be employed, or both may be dispensed with if the furnace-draft suffices without them. The blast-pipes may be connected to a main trunk 42, supplied from a rotary fan or blower 43. The supply of air to the fan 43 may be derived wholly from the outer air through the intake 44. I prefer, however, in most instances to derive the supply of air for the blower from the rotary stirrer-columns and the arms of said columns. To this end I extend the pipe 45 backward throughout the length of the furnace and take off from it at appropriate intervals transverse pipes 46, having bent ends 47, located directly above the rotary stirrer-columns and resting within seats 48 upon the connection 49, with which communicates the interior of the rotary column direct and each of the hollow stirrer-arms. As indicated more fully in Figs. 13, 18, and 19, these connections include slides or dampers 50, so that the passage of air through any particular connection may be interrupted or regulated at the will of the operator. By this expedient, for instance, the draft through the pipe 51, located within the hollow stirrer 52 of the upper tier of stirrer-arms, may be established by appropriate manipulation of the dampers at any desired ratio to the draft through the pipe 53 of a stirrer-arm 54 in the lower tier. The operator is, in fact, enabled to graduate or regulate the passage of the cooling-air to all parts of the rotary column and its stirrer-arms in accordance with the particular temperature prevailing in the different portions of the kiln. The heat that is abstracted from the rotary columns and stirrer-arms is again returned to the furnace in the form of heated air, which may be tempered or not, as the case may be, by means of additional air entering through the intake 44. The rotary columns and stirrer-arms, therefore, receive corresponding protection against overheating and warping without material loss of heat to the operation as a whole.

In order to balance the weight of the stirrer-arms upon the rotary columns, they are arranged symmetrically about the periphery thereof. For instance, as indicated in Fig. 17, where three stirrer-arms 52, 54, and 56 are employed they are arranged at one hundred and twenty degrees apart, as viewed in plan. As shown in Fig. 13, the air-pipe extends outwardly to nearly the outer end of the stirrer-arm, so that there will be an inflow of air along the stirrer to its outer end and a return flow, thereby obtaining a maximum cooling effect for the quantity of air admitted. At their inner ends the stirrers are trough-shaped, as indicated in Fig. 13, and are notched at their extreme inner ends, so as to engage with corresponding locking projections 57, formed within the rotary columns. The rotary columns are provided with suitable openings slightly beveled, as shown, in order to permit the insertion of the stirrer-arms at a slight angle and their subsequent locking in a horizontal position. The stirrer-arms are provided with two sets of stirrer-fingers or plow-points. As indicated in Figs. 14 and 15, one of these sets of plow-points is located along the forward or advancing edge of the stirrer-arm, and the other set is located along the rear edge of the stirrer-arm and in the intervals between the plow-points ahead of it. As a consequence, the tendency of the forward series to form corresponding ridges in the kiln charge is neutralized by the distributing effect of the rear series of plow-points, each stirrer-arm thus effecting its own distributing without relying upon the action of a subsequent stirrer-arm for that purpose.

In order to obtain the maximum output for a given length of furnace, I prefer to employ several kiln-hearths arranged one above the other, as shown in the drawings, the arrangement being such that the ore is caused to advance progressively from the place where it is charged to the final point of discharge from one hearth to another of the series, the point of discharge being immediately adjacent to the bridge-wall of the heating-furnace, and consequently at the hottest part of the kiln. The constantly-progressing layer of ore, moreover, diminishes in thickness from the entrance to the point of final exit, so that as the ore becomes poorer in sulfur it receives a higher heat, tending to complete its final desulfurization.

The advance of the ore in a layer of gradually-diminishing thickness, as referred to, is effected by the revolving stirrer-arms arranged on each hearth, as indicated in Fig. 3. Thus the ore admitted to the charging-hopper is spread out evenly by the stirrer-arm adjacent thereto, whereupon the next adjacent stirrer-arm in passing through the ore in its own path of movement spreads said ore out in a layer of correspondingly-diminishing thickness. The third stirrer-arm in passing through the layer of ore spread by the second stirrer-arm forms a third layer of still less thickness, and so on throughout the entire hearth and the lower hearths as well. In the meantime the ore is continuously supplied by the charging-hopper, so as to maintain a constant supply.

The charge-hopper, as shown more fully in Figs. 7, 20, 21, 22, and 23, may be automatically operated to discharge the predetermined quantity of ore into the kiln at each revolution of the rotary column adjacent to it. As shown in the drawings, it consists of a hopper proper, 60, having a gas-tight hinged bottom 61, provided with weights 62 sufficiently heavy to sustain the bottom and the hopper charge until positively tripped and opened. The hopper rests upon a throat-piece 63 and an inlet-chute 64, opening upon the charging-floor of the upper hearth. Upon the rock-shaft 65 of the hopper-bottom is located the trip-arm 66, which is in the path of movement of a similar trip-arm 67 upon the adjacent rotary column, so that with each revolution of the column the discharge-bottom of the hopper is positively opened and its contents dropped upon the charging-floor of the kiln, whereupon as the column continues its rotation and releases the hopper-bottom the latter returns to place, closing the hopper for the reception of a new charge.

The discharge of the desulfurized material takes place through the hopper. (Shown in section assembled in Fig. 2 and in detail in Figs. 24 to 25, inclusive.) The desulfurized material passes through the rectangular throat 68, which converges at its lower end into a conical discharge-opening, and drops the material upon a circular plate 70, adjustable by means of the screw-bolts 71, so as to permit the exit of the material, while at the same time sealing the lower end of the throat 68.

It will be understood that the furnace may be operated either as a muffle-furnace, excluding all air from the kiln-hearths, or, as indicated in Fig. 2, air may be admitted through the pipes 72 to obtain any desired degree of combustion of the sulfur that may be deemed necessary to maintain a suitable temperature for the operation, depending upon the character of the ore treated. The sulfurous gases pass off through the stacks 74 to the lead chambers, catalytic retorts, or the like, as will be readily understood, for the manufacture of sulfuric acid or sulfuric anhydrid or sulfurous anhydrid for sulfite pulp, &c.

In Figs. 30 and 31 I have shown a modified arrangement wherein the stirrer-columns rotate alternately in opposite directions, as indicated by the arrows. This arrangement permits each column on each hearth to have two oppositely-placed stirrer-arms 75 76, while permitting the arms on adjacent columns to clear each other, as before. In this instance, moreover, a single row of teeth or plow-points can be used on each stirrer-arm, the teeth or plow-points of the second arm 76 of each pair raking over the material in the wake of the spaces between the teeth or plow-points of the first arm 75. Furthermore, it is desirable to gradually diminish the size of the teeth or plow-points from the center to the periphery of the stirrer-arms (whether the latter be of the single-tooth type or double-tooth type) and also to gradually diminish the angle at which they are placed in order to minimize the danger of the ore piling up at the end of the arms and being thus dragged unroasted through the furnace, owing to the greater speed of the arms at their outer ends. Thus in Fig. 32, which shows a portion of a stirrer-arm of the double-tooth type, 78 indicates the main body portion of the arm adapted to revolve in the direction indicated by the arrow. It will be noted that the forward row of stirrer-teeth are spaced at gradually-approaching intervals and that the rear row gradually diminish in size and in the angle which they present to the ore.

Having thus described my invention, what I claim is—

1. A furnace-chamber, provided with transverse arches spaced apart along the length of the chamber and independent of each other, each having its individual buckstaves and tie-rods, and intervening brickwork occupying the spaces between the arches and completing the furnace side walls; substantially as described.

2. A roasting-furnace provided with a rotatory hollow column having hollow stirrer-arms, means for creating a flow of a cooling medium through said column and arms, and means for controlling independently the flow through the column and through the several stirrer-arms; substantially as described.

3. A roasting-furnace provided with a rotatory hollow column having hollow stirrer-arms, a pneumatic fan for inducing a flow of air through said column and arms and means for controlling independently the flow of air through the column and through the several stirrer-arms; substantially as described.

4. A roasting-furnace, provided with a rotatory hollow column having hollow stirrer-arms, a pneumatic fan for occasioning a flow of air through said column and arms, individual pipes leading to said arms and valves for controlling the amount of flow through any individual stirrer-arm or through the column itself; substantially as described.

5. In a roasting-furnace, a rotatory column provided with a stirrer-arm having a series of plow-points along its forward edge and a second series of plow-points along its rear edge, the second series being opposite the intervals between the members of the first series and of gradually-decreasing size from the inner toward the outer end of the arm; substantially as described.

6. In a roasting-furnace, a rotatory column provided with a stirrer-arm having a series of plow-points or teeth presenting angular fronts to the material stirred, said teeth decreasing in size from the inner toward the outer end of the arm; substantially as described.

7. A furnace provided with a combustion-chamber, a heating-flue into which the products of combustion pass from said chamber, a roasting or desulfurizing chamber consisting of a plurality of hearths one above the other, said hearths being located above the heating-flue and provided with stirrer and conveyer mechanism, and an uptake and downtake chamber into which the heating-flue discharges, said uptake and downtake chamber being located at the rear of the lower hearths and extending up to the level of the upper hearth, substantially as described.

8. A furnace provided with a combustion-chamber, a heating-flue into which the products of combustion pass from said chamber, a roasting or desulfurizing chamber consisting of a plurality of hearths one above the other, said hearths being located above the heating-flue and provided with stirrer and conveyer mechanism, and an uptake and downtake chamber into which the heating-flue discharges, said uptake and downtake chamber being located at the rear of the lower hearths and extending up to the level of the upper hearth, and air-heating flues extending along the bottom of the heating-flue and opening into said uptake and downtake chamber; substantially as described.

In testimony whereof I affix my signature in presence of two witnesses.

FREDERIC JOHN FALDING.

Witnesses:
    ALFRED THOMAS,
    MINNABELLE CLASSEY.